United States Patent
Zhu et al.

(10) Patent No.: US 11,685,610 B2
(45) Date of Patent: Jun. 27, 2023

(54) PICK-AND-PLACE DEVICE OF DISPLAY SCREEN SUBSTRATE AND CONTROL METHOD FOR PICKING AND PLACING DISPLAY SCREEN SUBSTRATE

(71) Applicants: BOE Technology Group Co., Ltd., Beijing (CN); Hefei Xinsheng Optoelectronics Technology Co., Ltd., Anhui (CN)

(72) Inventors: Feifei Zhu, Beijing (CN); Wenming Ren, Beijing (CN)

(73) Assignees: BOE Technology Group Co., Ltd., Beijing (CN); Hefei Xinsheng Optoelectronics Technology Co., Ltd., Anhui (CN)

(*) Notice: Subject to any disclaimer, the term of this patent is extended or adjusted under 35 U.S.C. 154(b) by 1371 days.

(21) Appl. No.: 16/073,193

(22) PCT Filed: Nov. 24, 2017

(86) PCT No.: PCT/CN2017/112821
§ 371 (c)(1),
(2) Date: Jul. 26, 2018

(87) PCT Pub. No.: WO2018/171237
PCT Pub. Date: Sep. 27, 2018

(65) Prior Publication Data
US 2021/0206580 A1    Jul. 8, 2021

(30) Foreign Application Priority Data

Mar. 20, 2017    (CN) .......................... 201710168374.8

(51) Int. Cl.
*B65G 43/08*    (2006.01)
*B65G 47/90*    (2006.01)
(Continued)

(52) U.S. Cl.
CPC ............. *B65G 43/08* (2013.01); *B65G 47/90* (2013.01); *B65G 49/063* (2013.01); *G01G 19/52* (2013.01); *B65G 2203/0258* (2013.01)

(58) Field of Classification Search
None
See application file for complete search history.

(56) References Cited

U.S. PATENT DOCUMENTS 8,469,346 B2 *    6/2013  Ito ..................... H01L 21/67109
                                                                 414/941
9,056,713 B2 *    6/2015  Li .......................... B65D 85/48
(Continued)

FOREIGN PATENT DOCUMENTS

CN    1807199 A    7/2006
CN    1868827 A    11/2006
(Continued)

OTHER PUBLICATIONS

Feb. 19, 2019—(CN) Second Office Action Appn 201710168374.8 with English Translation.
(Continued)

*Primary Examiner* — William R Harp
(74) *Attorney, Agent, or Firm* — Banner & Witcoff, Ltd.

(57) ABSTRACT

A pick-and-place device of display screen substrate and a control method for picking and placing a display screen substrate are disclosed. The pick-and-place device of display screen substrate includes a housing, a support assembly and a control component. The support assembly is disposed in the housing and includes: a support plate extending in a first direction, and two sets of support bars disposed opposite to each other and spaced apart from each other in the first direction. Each set of support bars includes a plurality of support bars arranged at intervals along a second direction, and each support bars is movable in a third direction. The support plate and the support bar are connected with the
(Continued)

housing respectively, and the support plate is provided with an opening configured to allow the support bar to move along the third direction.

11 Claims, 5 Drawing Sheets

(51) Int. Cl.
*B65G 49/06* (2006.01)
*G01G 19/52* (2006.01)

(56) References Cited

U.S. PATENT DOCUMENTS

| | | | |
|---|---|---|---|
| 10,304,711 B2* | 5/2019 | Xu | ............... H01L 21/67709 |
| 2006/0032826 A1 | 2/2006 | Liu | |
| 2006/0226093 A1 | 10/2006 | Cho et al. | |
| 2011/0024963 A1 | 2/2011 | Ito | |
| 2014/0326686 A1 | 11/2014 | Li et al. | |

FOREIGN PATENT DOCUMENTS

| | | |
|---|---|---|
| CN | 201309690 Y | 9/2009 |
| CN | 101659346 A | 3/2010 |
| CN | 201678286 U | 12/2010 |
| CN | 101989563 A | 3/2011 |
| CN | 102741993 A | 10/2012 |
| CN | 203020788 U | 6/2013 |
| CN | 203237607 U | 10/2013 |
| CN | 107010417 A | 8/2017 |
| JP | 2003152069 A | 5/2003 |
| KR | 20080021325 A | 3/2008 |
| KR | 20080103788 A | 11/2008 |

OTHER PUBLICATIONS

Feb. 28, 2018—(WO) International Search Report and the Written Opinion Appn PCT/CN2017/112821 with English Translation.

Aug. 14, 2018—(CN) First Office Action Appn 201710168374.8 with English Translation.

* cited by examiner

PICK-AND-PLACE DEVICE OF DISPLAY SCREEN SUBSTRATE AND CONTROL METHOD FOR PICKING AND PLACING DISPLAY SCREEN SUBSTRATE

The application is a U.S. National Phase Entry of International Application No. PCT/CN2017/112821 filed on Nov. 24, 2017, designating the United States of America and claiming priority to Chinese Patent Application No. 201710168374.8, filed on Mar. 20, 2017. The present application claims priority to and the benefit of the above-identified applications and the above-identified applications are incorporated by reference herein in their entirety.

TECHNICAL FIELD

Embodiments of the present disclosure relate to a pick-and-place device of display screen substrate and a control method for picking and placing a display screen substrate.

BACKGROUND

In the related art, during a manufacturing process of a liquid crystal display, a display screen substrate needs to be transported between multiple relatively independent apparatuses for several times. In an actual manufacturing process, a pick-and-place device capable of carrying a plurality of display screen substrates is generally used as a carrier device for storage and transportation of the display screen substrate, and the pick-and-place device is transported between production apparatuses in a mechanical transport manner. The display screen substrates disposed in layers are picked and placed by a mechanical arm for corresponding operations.

At this stage, with the development of large-generation lines in the TFT-LCD industry, display screen substrates and display screens obtained by cutting are becoming larger and larger, and large-size display screen substrates and display screens may be severely deformed in a conventional pick-and-place device, resulting in defects such as substrate damage and abnormal display of the display screen. For large-size display screens, a foam box is manually used in many existing production lines, resulting in huge manpower loss and poor production efficiency.

SUMMARY

The embodiments of the present disclosure aim to solve at least one technical problem existing in the prior art. To this end, embodiments of the present disclosure provide a pick-and-place device of display screen substrate, which can provide a uniform and stable support for the display screen substrate and can also ensure a smooth pick-and-place operation of the display screen substrate.

The embodiments of the present disclosure further provide a control method for picking and placing a display screen substrate.

According to the first aspect of the disclosure, a pick-and-place device of display screen substrate is provided, including: a housing; a support assembly disposed inside the housing, including a support plate and two sets of support bars, the support plate extending along a first direction, the two sets of support bars being disposed opposite to each other and spaced apart from each other in the first direction, each set of the two sets of support bars including a plurality of support bars, the plurality of support bars in each set being arranged at intervals along a second direction perpendicular to the first direction in a plane of the support plate, and each of the plurality of support bars being movable along a third direction perpendicular to the plane of the support plate, the support plate and each of the plurality of support bars being connected with the housing respectively, and the support plate being provided with an opening configured to allow the support bar to move along the third direction; and a control component configured to control the support assembly.

In the pick-and-place device of display screen substrate according to an embodiment of the present disclosure, the support assembly is configured as a structure including the support plate and the two sets of support bars, which two sets of support bars are disposed opposite to each other and spaced apart from each other, so as to provide a uniform and stable support for the display screen substrate, and to avoid defects such as deformation, breakage, and abnormal display of the display screen substrate caused by uneven support; at the same time, the opening provided in the support plate ensures convenient pick-and-place operation of the display screen substrate, and can effectively reduce the human labor and also improve the production efficiency.

According to some optional embodiments, the support assembly further includes: two connecting bars disposed on the housing, and each of the two connecting bars extends along the second direction and is movable along the third direction, wherein the two sets of support bars of the support assembly are connected with the two connecting bars respectively, and a via hole configured to allow the support bar to move upwards and downwards along the third direction is provided in a sidewall of the housing.

According to some optional embodiments, the support plate is capable of expanding and retracting along the first direction.

Optionally, the support plate includes two sub-support plates, and the two sub-support plates are arranged along the first direction and are connected with the housing respectively, and wherein the two sub-support plates are capable of expanding towards each other or retracting along a direction away from each other.

Optionally, the two sub-support plates are connected by being abutted against each other or by being locked with each other.

According to some optional embodiments, two fixing plates extending along the third direction are arranged in the housing, and the two fixing plates are opposite to each other and are spaced apart from each other along the first direction, wherein the housing is provided with a guiding groove extending along the first direction, and at least one of the two fixing plates is provided with a guiding block capable of moving along the guiding groove, and wherein the two sets of support bars of the support assembly are connected with the two fixing plates respectively and disposed between the two fixing plates, and the support plate of the support assembly is disposed between the two fixing plates and connected with the two fixing plates.

According to some optional embodiments, the control component is disposed on the housing.

According to some optional embodiments, the pick-and-place device of display screen substrate further includes a plurality of support assemblies, and the plurality of support assemblies are arranged at intervals along the third direction.

According to some optional embodiments, the pick-and-place device of display screen substrate further includes a sensing component which is disposed in the housing and is configured to receive information indicative of picking and placing of the display screen substrate.

Optionally, the sensing component is an infrared sensing component which is disposed on an inner sidewall of the housing and is disposed corresponding to the support assembly in the third direction.

According to some optional embodiments, the pick-and-place device of display screen substrate further includes a weight sensor which is disposed on the support bar and is configured to detect a change in support weight on the support bar.

According to the second aspect of the present disclosure, a control method for picking and placing a display screen substrate is provided, the display screen substrate is suitable for being stored in a pick-and-place device, the pick-and-place device includes a housing, a support assembly, a control component, a sensing component and a weight sensor; the support assembly is provided in the housing, the support assembly includes a support plate and two sets of support bars, the support plate extends along a first direction, the two sets of support bars are disposed opposite to each other and spaced apart from each other in the first direction, each set of the two sets of support bars includes a plurality of support bars, the plurality of support bars in each set are arranged at intervals along a second direction perpendicular to the first direction in a plane of the support plate, and each of the plurality of support bars is movable along a third direction perpendicular to the plane of the support plate, the support plate and each of the plurality of support bars are connected with the housing respectively, the support plate is provided with an opening configured to allow the support bar to move along the third direction, and the display screen substrate is suitable for being placed on the support plate, the control component is disposed on the housing and configured to control the support assembly, the sensing component is disposed inside the housing and configured to receive information indicative of picking and placing of the display screen substrate, the weight sensor is disposed on the support bar and configured to detect a change in support weight on the support bar.

The control method includes:

upon receiving a signal from a mechanical arm configured to pick and place the display screen substrate by the sensing component, controlling the two sets of support bars of the support assembly to move towards the mechanical arm along the third direction to a preset position by the control component to reserve a working space for the mechanical arm, and upon detecting a change in support weight on the support bar by the weight sensor, determining a picking or placing state of the display screen substrate by the control component according to information of the change in support weight in such a manner that: the support weight being increased indicates the display screen substrate being placed on the two sets of support bars by the mechanical arm, then controlling the two sets of support bars to move away from the mechanical arm along the third direction to a position below the support plate by the control component so that the display screen substrate is supported on the support plate; and the support weight being reduced indicates the display screen substrate being moving away from the support plate by the two sets of support bars while the two sets of support bars moving towards the mechanical arm along the third direction, then picking the display screen substrate by the mechanical arm and maintaining the two sets of support bars at the preset position.

Optionally, the support plate is capable of expanding and retracting along the first direction, and the pick-and-place device further includes a position sensor configured to detect a height of the working space, the control method further includes: upon the support bar moving towards the mechanical arm along the third direction to the preset position, if the height of the working space detected by the position sensor fails to reach a preset value, then controlling the support plate to retract by the control component so as to increase the working space; upon detecting a change in support weight on the support bar by the weight sensor, determining a picking or placing state of the display screen substrate by the control component according to the information of the change in support weight in such a manner that: the support weight being increased indicates the display screen substrate being placed on the two sets of support bars by the mechanical arm, then controlling the support plate to expand and controlling the two sets of support bars to move away from the mechanical arm along the third direction to a position below the support plate by the control component so that the display screen substrate is supported on the support plate; the support weight being reduced indicates the two sets of support bars being moving towards the mechanical arm along the third direction while supporting the display screen substrate to move away from the support plate, then picking the display screen substrate by the mechanical arm, maintaining the support plate in a retracted state, and maintaining the two sets of support bars at the preset position.

BRIEF DESCRIPTION OF THE DRAWINGS

In order to allow those skilled in the art to clearly understand the present disclosure in a better way, the embodiments of the present disclosure will be described below in more details with reference to the accompanying drawings of the embodiments of the present disclosure. In the accompanying drawings.

DETAILED DESCRIPTION

Figure 1:
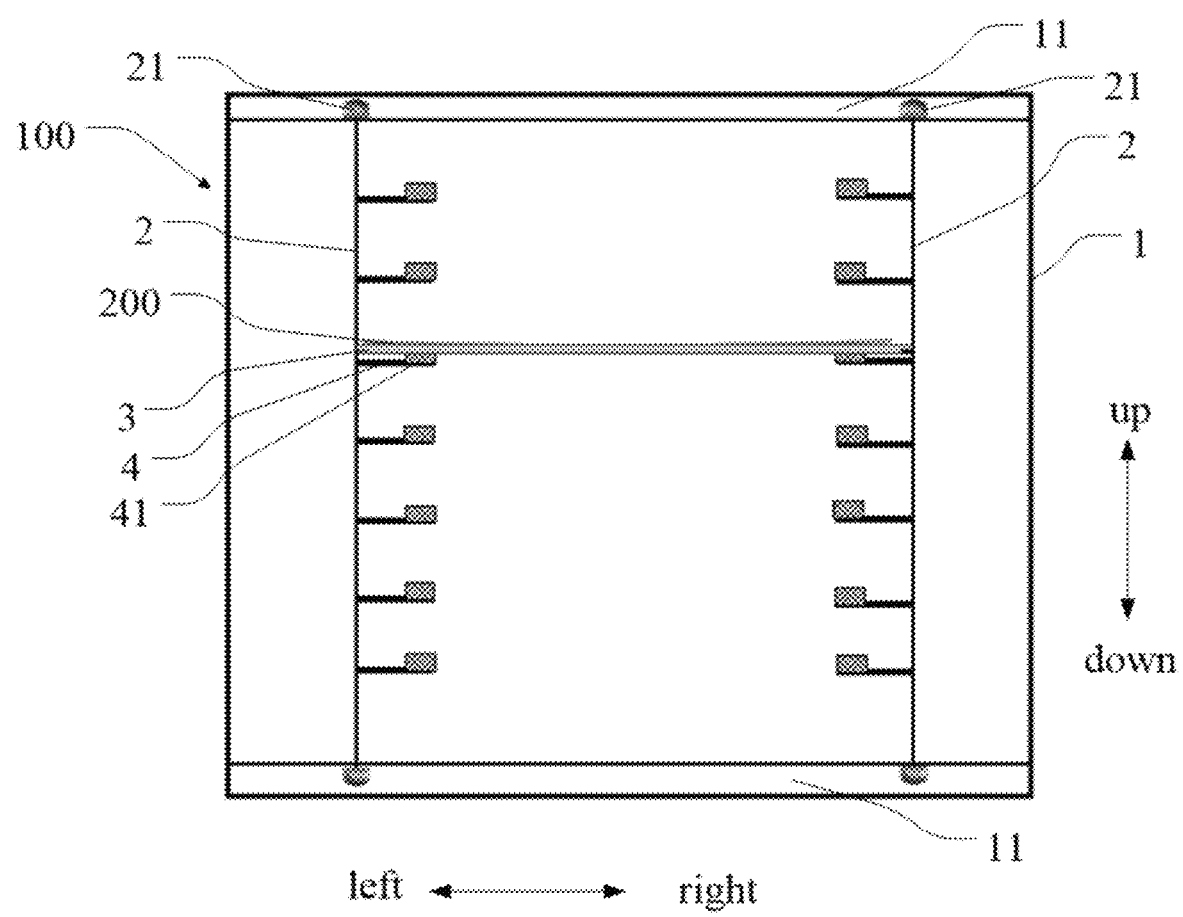
FIG. 1 is a schematic view of a pick-and-place device of display screen substrate according to an embodiment of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for invention, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. "On," "under," "right," "left" and the like are only used to indicate relative position relationship, and when the position of the object which is described is changed, the relative position relationship may be changed accordingly.

According to a first aspect of the present disclosure, embodiments of the present disclosure provide a pick-and-place device of display screen substrate. The pick-and-place device of display screen substrate includes: a housing; a support assembly disposed inside the housing, including a support plate and two sets of support bars, the support plate extending along a first direction, the two sets of support bars being disposed opposite to each other and spaced apart from each other in the first direction, each set of the two sets of support bars including a plurality of support bars, the plurality of support bars being arranged at intervals along a second direction perpendicular to the first direction in a plane of the support plate, and each of the plurality of support bars being movable along a third direction perpendicular to the plane of the support plate, the support plate and each of the plurality of support bars being connected with the housing respectively, the support plate being provided with an opening configured to allow the support bar to move along the third direction; and a control component configured to control the support assembly.

In some embodiments, as illustrated in FIGS. 1 to 5, the above-mentioned first direction is, for example, a left-and-right direction in the drawing, and the above-mentioned second direction is, for example, a front-and-back direction in the drawing (i.e., a direction perpendicular to a surface of paper), and the above-mentioned third direction is, for example, an up-and-down direction in the drawing.

Hereinafter, a pick-and-place device of display screen substrate 100 according to an embodiment of the first aspect of the present disclosure will be described with reference to FIGS. 1 to 5.

As illustrated in FIGS. 1-5, according to an embodiment of the first aspect of the present disclosure, a pick-and-place device of display screen substrate 100 includes a housing 1, a support assembly, and a control component 5.

For example, the support assembly is disposed inside the housing 1, and the support assembly includes a support plate 3 and two sets of support bars 4. The two sets of support bars 4 are opposite to each other and spaced apart from each other in the left-and-right direction. Each set of the two sets of support bars 4 includes a plurality of support bars 4 arranged at intervals in the front-and-back direction (for example, each set of support bars 4 can include four support bars), each of the plurality of support bars 4 can move up and down, and the support plate 3 and the plurality of support bars 4 are respectively connected with the housing 1. The control component 5 is configured to control the support assembly. For example, the control component 5 can control each support bar 4 to move up and down. The control component 5 can be provided on the housing 1.

The support plate 3 is provided with an opening 311 configured to allow the support bar 4 to move up and down. The support plate 3 and the two sets of support bars 4 in the support assembly are distributed along the up-down direction. The support plate 3 is provided with the above-mentioned opening 311 at each position corresponding to each support bar 4. For example, the support plate 3 can be supported on the two sets of support bars 4; or, each support bar 4 in the support assembly can be received in the opening 311 and is not beyond the support plate 3 (with a relative height not greater than the support plate 3). Therefore, by providing the opening 311, an up-and-down movement of the support bar 4 can be conveniently realized; through the up-and-down movement of the two sets of the support bars 4, a working space for picking and placing the display screen substrate 200 is provided between the two sets of support bars 4 and the support plate 3 of the support assembly, thereby ensuring a smooth pick-and-place operation of the display screen substrate 200.

When the pick-and-place device 100 is adopted to place the display screen substrate 200, the display screen substrate 200 can be placed on the support plate 3, so that the display screen substrate 200 is uniformly and stably supported by the support plate 3, which can avoid defects such as deformation, breakage, and abnormal display of the display screen substrate 200 caused by uneven support. At the same time, by providing the opening 311 in the support plate 3, the support bar 4 can be conveniently moved upwards and downwards so that there is a working space for picking and placing the display screen substrate 200 between the two sets of support bars 4 and the support plate 3 in the support assembly, so as to ensure a smooth pick-and-place operation of the display screen substrate 200.

Moreover, compared with the conventional method in which a foam box is manually used, the pick-and-place device 100 provided by the embodiment of the present disclosure can effectively reduce the human labor and improve the production efficiency.

Optionally, the pick-and-place device 100 includes a plurality of support assemblies. The plurality of support assemblies can be arranged at intervals along the up-and-down direction. The display screen substrate 200 can be placed on the support plate 3 of each support assembly, so that the capacity of the pick-and-place device 100 can be increased. It should be noted that, when the pick-and-place device 100 includes a plurality of the above-mentioned support assemblies, it can further include a plurality of the above-mentioned control components 5, and the plurality of control components 5 are disposed in one-to-one correspondence with the plurality of support assemblies. For example, each control component 5 is configured to control two sets of support bars 4 in the corresponding support assembly to move up and down.

Optionally, an elastic pad 41 (for example, a plastic pad or a rubber pad) can be further provided on each support bar 4 in the support assembly. In this case, the support plate 3 can be disposed on an upper surface of the elastic pad 41. By providing the elastic pad 41, when the support bar 4 moves upwards to support the display screen substrate 200, the display screen substrate 200 can be supported by the elastic pad 41, so as to avoid any abrasion and scratch of the display screen substrate 200 by preventing the display screen substrate 200 from being in a direct contact with the support bar 4.

Hereinafter, an illustrative process of a pick-and-place operation of the display screen substrate using the pick-andplace device 100 described above will be briefly described with reference to FIGS. 1 to 5.

When the display screen substrate 200 needs to be stored in the pick-and-place device 100, controlling the two sets of support bars 4 in the corresponding support assembly to move upwards to a preset position by the control component 5 so that a working space suitable for an operation of the mechanical arm 300 is provided between the two sets of support bars 4 and a corresponding support plate 3; then placing the display screen substrate 200 on the two sets of support bars 4 by the mechanical arm 300, and temporarily supporting the display screen substrate 200 by the two sets of support bars 4. After the mechanical arm 300 is withdrawn, controlling the two sets of support bars 4 to move downwards to an initial position by the control unit 5. At this moment, the display screen substrate 200 is supported on the support plate 3. In this way, a uniform and stable support of the display screen substrate 200 can be achieved. With this, an operation of placing the display screen substrate 200 is completed.

When the display screen substrate 200 needs to be taken away from the support plate 3, controlling the two sets of support bars 4 in the corresponding support assembly to move up to a preset position by the control component 5 so that a working space suitable for the operation of the mechanical arm 300 is provided between the two sets of support bars 4 and a corresponding support plate 3 in the support assembly. During the upward movement of the two sets of support bars 4, the two sets of support bars 4 lift up the display screen substrate 200 having been placed on the support plate 3 so that the display screen substrate 200 is supported by the two sets of support bars 4. Then, taking the display screen substrate 200 away by the mechanical arm 300, and maintaining the two sets of support bars 4 at the preset position for use next time when a display screen substrate 200 needs to be stored.

It should be noted that, in order to facilitate the operation of the mechanical arm 300 stretching into the housing 1 for picking and placing the display screen substrate 200, a front side of the housing 1 can be opened, or a front side of the housing 1 can be provided with a door for opening and closing the housing 1. When the mechanical arm 300 performs the pick-and-place operation of the display screen substrate 200, a corresponding side of the housing 1 is opened by operating the door. When the display screen substrate 200 is placed and transported, a corresponding side of the housing 1 is closed by operating the door.

In the pick-and-place device of display screen substrate 100 according to an embodiment of the present disclosure, by providing the support assembly in the pick-and-place device 100 as a structure including the two sets of support bars 4 oppositely disposed and spaced apart as well as the support plate 3, the display screen substrate 200 can be supported uniformly and stably, so as to prevent from defects such as deformation, damage or abnormal display of the display screen substrate 200 due to uneven support. At the same time, the opening 311 provided on the support plate 3 can ensure a smooth pick-and-place operation of the display screen substrate, effectively reduce the human labor and improve the productivity.

According to some optional embodiments of the present disclosure, the two sets of support bars 4 in the support assembly can be connected with the housing 1 respectively, and a plurality of first guide rails can be disposed on the housing 1, each of the plurality of first guide rails corresponds to one support bar 4 and extends in the up-and-down direction, and each support bar 4 can move along a corresponding first guide rail, whereby each support bar 4 can be moved in a preset direction in a better way. A length of each first guide rail can be set according to a distance of the up-and-down movement of the support bar 4. For example, a length of each of the plurality of first guide rails can be equal to a movement distance of a corresponding support bar 4 in the up-and-down direction, whereby an end-point position and a movement distance of each support bar 4 in the up-and-down direction can be defined. The housing 1 can be further provided with an expandable and retractable, supporting boss. When the support bar 4 is moved to a preset position, the supporting boss is stretched out to provide a support for the support bar 4 and also to position the support bar 4.

According to other optional embodiments of the present disclosure, the support assembly can further include two connecting bars provided on the housing 1, each of the two connecting bars extends along the front-and-back direction and is movable along the up-and-down direction. The housing 1 can be provided with second guide rails extending along the up-and-down direction, each connecting bar can move along a corresponding second guide rail, so that each connecting bar is moved along a preset direction in a better way. The two sets of support bars 4 of the support assembly are connected with two connecting bars respectively. A via hole configured to allow the support bar 4 to move upwards and downwards is disposed in a sidewall of the housing 1. For example, a left sidewall and a right sidewall of the housing 1 are provided with the via hole respectively, and each via hole can be formed in an elongated shape extending in the up-and-down direction. Thus, by providing the connecting bar, the support bar 4 can be more conveniently moved upwards and downwards, and the plurality of support bars 4 in each set of support bars 4 can be well moved synchronously.

It should be noted that, the plurality of via holes provided in the sidewall of the housing 1 can be independent and spaced apart from each other, or can be communicated with each other. When these via holes are communicated with each other, it is equivalent to the case of opening the left side and right side of the housing 1.

Figure 2:
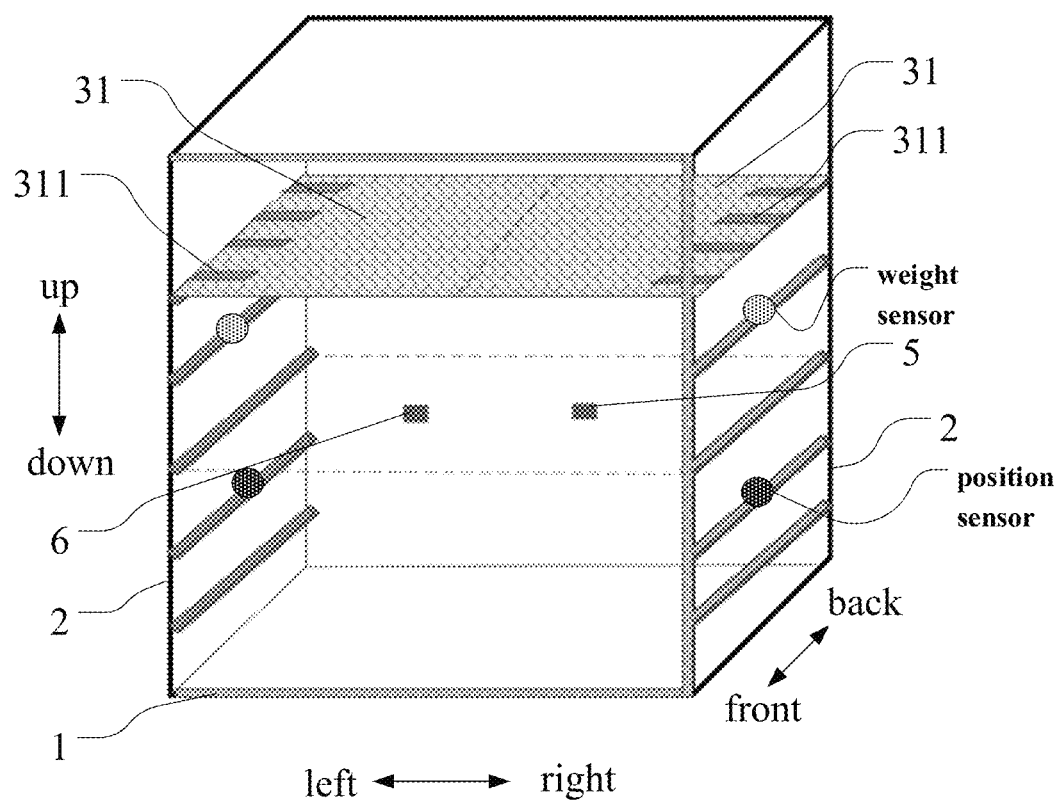
FIG. 2 is a schematic view illustrating a part of a structure of a pick-and-place device of display screen substrate according to an embodiment of the present disclosure.
Figure 3:
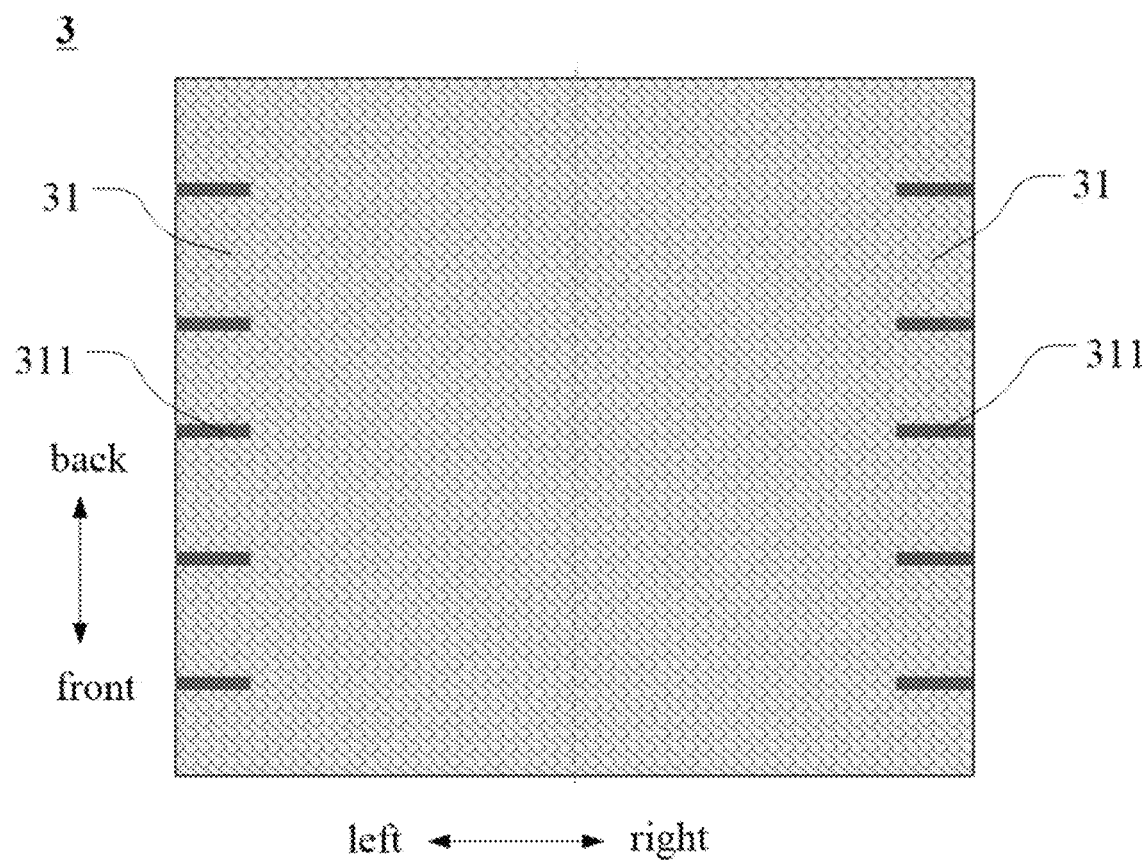
FIG. 3 is a schematic view of a support plate of a pick-and-place device of display screen substrate according to an embodiment of the present disclosure.
Figure 5:
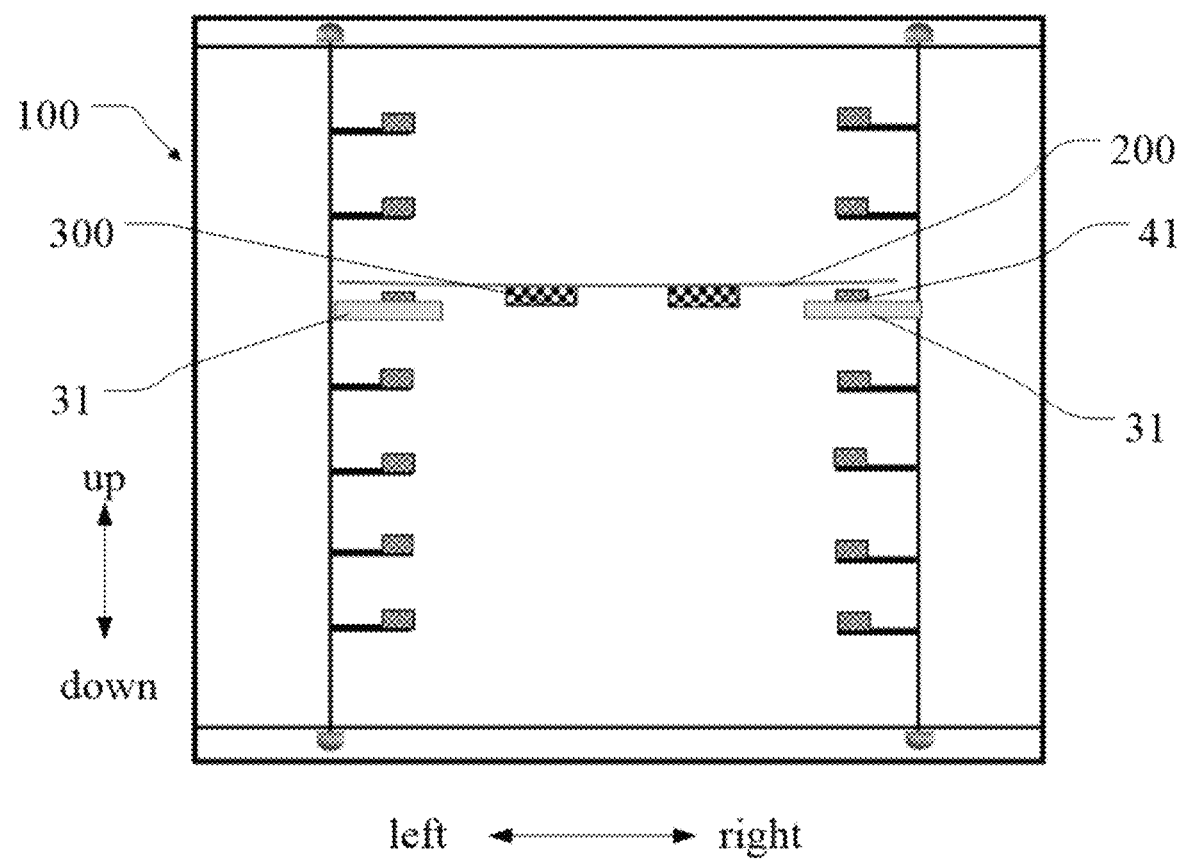
FIG. 5 is a schematic view illustrating a pick-and-place process of a display screen substrate according to another embodiment of the present disclosure.

According to some optional embodiments of the present disclosure, referring to FIG. 2, FIG. 3, and FIG. 5, the support plate 3 can be expanded and retracted in the left-and-right direction. When the support plate 3 is expanded along the left-and-right direction, the display screen substrate 200 can be supported on the support plate 3. When the support plate 3 is retracted along the left-and-right direction, a larger working space can be reserved for the pick-and-place operation of the display screen substrate 200. Thus, more working space for the pick-and-place operation of the display screen substrate 200 can be reserved by retracting of the support plate 3 in the left-and-right direction, so as to be further adapted to different situations. For example, in the case where the pick-and-place device 100 has a fixed volume, a space for the two sets of support bars 4 of the support assembly to move upwards and downwards may be small. In this case, the retraction of the support plate 3 can be utilized to reserve a sufficient working space for the pick-and-place operation of the display screen substrate 200, so as to further ensure a smooth pick-and-place operation of the display screen substrate 200.

In some embodiments of the present disclosure, the support plate 3 can be an integral, flexible, plate member and has a reel disposed on the left or right sidewall of the housing 1. For example, the reel of the support plate 3 is disposed on the left sidewall of the housing 1 and is located outside the housing 1, and the support plate 3 can be winded onto the reel by a rotation of the reel so as to achieve retraction of the support plate 3. When the reel is rotated in a reverse direction, the support plate 3 is released from the reel, and a free end of the support plate 3 is moved and expanded to the right, so as to be abutted against the right sidewall of the housing 1 or be locked into a groove in the right sidewall of the housing 1.

In other embodiments of the present disclosure, referring to FIG. 2, FIG. 3, and FIG. 5, the support plate 3 includes two sub-support plates 31. The two sub-support plates 31 are arranged opposite to each other in the left-and-right direction and are connected with the housing 1 respectively. When the display screen substrate 200 needs to be placed on the support plate 3, the two sub-support plates 31 are expanded towards each other. When the display screen substrate 200 needs to be taken away from the support plate 3, the two sub-support plates 31 are retracted in a direction away from each other. In this way, the support plate 3 can be easily expanded and retracted. For example, the left sidewall and the right sidewall of the housing 1 are provided with one reel respectively, and the two reels can be disposed outside the housing 1. By the rotation of the two reels respectively, the sub-support plate 31 can be winded onto a corresponding reel respectively so as to achieve the retraction of the two sub-support plates 31. When the two reels are rotated in opposite directions, the two sub-support plates 31 are released from the corresponding reels respectively, and the two sub-support plates 31 are expanded towards each other to constitute the support plate 3.

Optionally, after the two sub-support plates 31 are expanded towards each other, free ends of the two sub-support plates 31 can be connected with each other by being abutted against each other or by being locked with each other. As a result, the strength of the sub-support plates 31 can be enhanced to provide a better support.

It should be explained that, when the support plate 3 of the support assembly is retractable, the support plate 3 can be disposed above a corresponding support bar 4 in order to avoid any influence to the expansion and retraction of the support plate 3 resulted by the support bar 4 of the support assembly.

Of course, a manner of expanding and retracting of the support plate 3 is not limited to the above. For example, an end of the support plate 3 can be fixed on the housing 1, and the expanding and retracting of the support plate 3 can be realized by stretching and withdrawing in a laminated manner, or by winding and releasing in a flexible manner.

Figure 4:
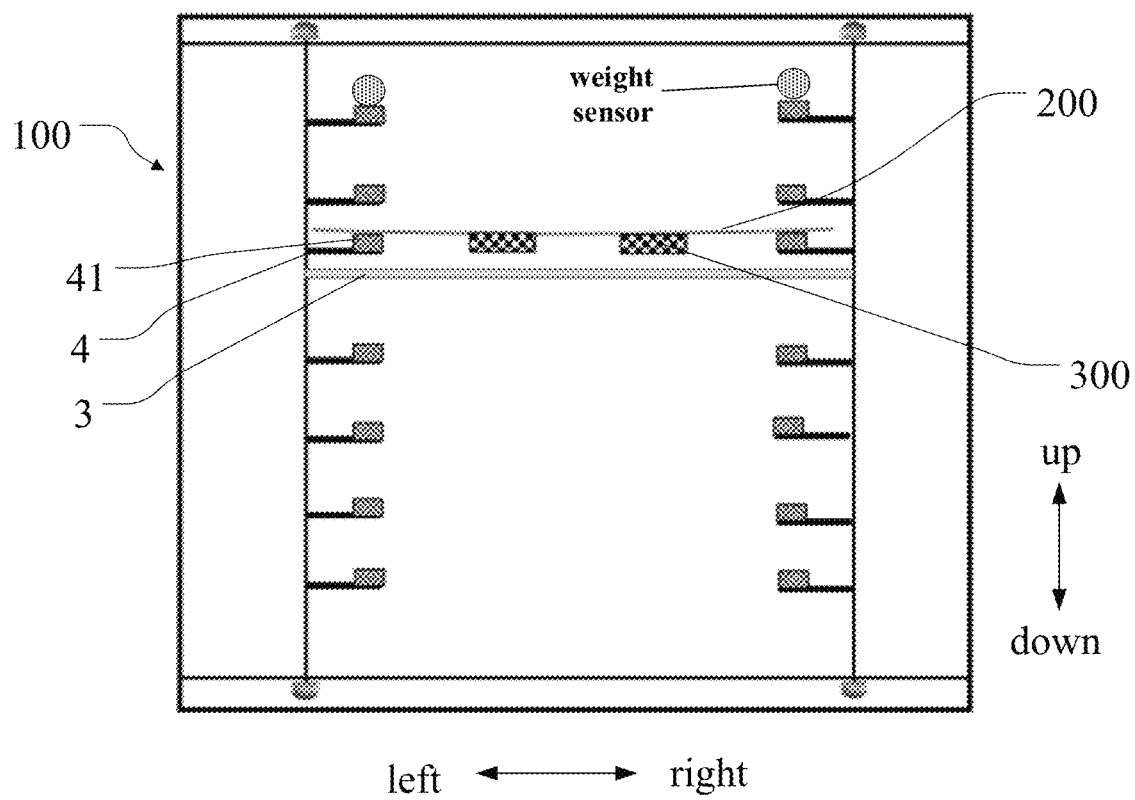
FIG. 4 is a schematic view illustrating a pick-and-place process of a display screen substrate according to an embodiment of the present disclosure.

According to some optional embodiments of the present disclosure, referring to FIG. 1, FIG. 4, and FIG. 5, two fixing plates 2 extending in the up-and-down direction are provided in the housing 1. The two fixing plates 2 are arranged opposite to each other and spaced apart from each other in the left-and-right direction. The housing 1 is provided with a guide groove 11 extending in the left-and-right direction. At least one of the two fixing plates 2 is provided with a guide block 21 which is movable along the guide groove 11. Thus, the movement of the guide block 21 along the guide groove 11 ensures the fixing plate 2 to move in a preset direction. For example, the fixing plate 2 on the left side can be moved along the guide groove 11, and the fixing plate 2 on the right side can be fixed. In this case, by moving the fixing plate 2 on the left side, a distance between the two fixing plates 2 can be changed. For another example, both the two fixing plates 2 can be moved along the guiding groove 11. In this case, either one of the two fixing plates 2 can be moved or both the two fixing plates 2 can be moved at the same time to adjust the two fixing plates 2 to suitable positions, so as to allow the distance between the two fixing plates 2 to meet the usage requirements.

The two sets of support bars 4 of the support assembly are connected with the two fixing plates 2 respectively and disposed between the two fixing plates 2, and the support plate 3 of the support assembly is connected between the two fixing plates 2. Thus, by providing the two fixing plates 2 as described above, the mounting and fixing of the support assembly can be facilitated, and the distance between the two fixing plates 2 can be adjusted by moving at least one of the two fixing plates 2 in the left-and-right direction, i.e., changing a support area of the support assembly accordingly, so as to be adapted to display screen substrates 200 of different sizes.

According to some optional embodiments of the present disclosure, referring to FIG. 2, the pick-and-place device 100 further includes a sensing component 6 disposed in the housing 1, the sensing component 6 is configured to receive information indicative of picking and placing of the display screen substrate 200. By providing the sensing component 6, it can be intelligently determined whether it needs to pick or place the display screen substrate 200 so that an automatic and intelligent pick-and-place operation of the display screen substrate 200 can be achieved.

Optionally, the sensing component 6 is an infrared sensing component 6, and the infrared sensing component 6 is disposed on an inner sidewall of the housing 1 and is disposed corresponding to the support assembly in the up-and-down direction. In this case, a front end of the mechanical arm 300 is provided with an infrared emitting element. When the infrared sensing component 6 receives an infrared signal from the mechanical arm 300, an operation of picking or placing the display screen substrate 200 can be performed according to the signal.

It should be explained that, when the pick-and-place device 100 includes a plurality of the above-mentioned support assemblies, a plurality of sensing components 6 are correspondingly disposed, and the plurality of sensing components 6 are disposed in one-to-one correspondence with the plurality of support bars.

According to some optional embodiments of the present disclosure, the pick-and-place device 100 further includes a weight sensor disposed on the support bar 4, the weight sensor is configured to detect a change in support weight on the support bar 4. By sensing a change in support weight on the support bar 4 by the weight sensor, it can be determined whether the mechanical arm 300 is performing an operation of picking or placing the display screen substrate 200. Specifically, when the weight sensor senses that the weight on the support bar 4 is increased, it indicates that the mechanical arm 300 is performing an operation of placing the display screen substrate 200 at this time; when the weight sensor senses that the weight on the support bar 4 is reduced, it indicates that the mechanical arm 300 is performing an operation of picking the display screen substrate 200 at this time.

It should be explained that, the weight sensor can be provided on one of the support bars 4 in the support assembly. When the pick-and-place device 100 includes a plurality of the above-mentioned support assemblies, a plurality of weight sensors are provided correspondingly. Each of the plurality of weight sensors is provided on one of the support bars 4 in each support assembly. Moreover, when the elastic pad 41 described above is provided on the support bar 4, the weight sensor can be provided on the elastic pad 41.

A control method for picking and placing the display screen substrate 200 according to an embodiment of the second aspect of the present disclosure will be described below with reference to FIGS. 4 and 5.

Referring to FIG. 4, the display screen substrate 200 is adapted to be stored in the pick-and-place device 100. The pick-and-place device 100 includes a housing 1, a support assembly, a control component 5, a sensing element 6, and a weight sensor. The support assembly is disposed inside the housing 1. The support assembly includes a support plate 3 and two sets of support bars 4, the two sets of support bars 4 are opposite to each other and spaced apart from each other in the left-and-right direction. Each set of the two sets of support bars 4 includes a plurality of support bars 4 arranged at intervals in the front-and-back direction, and each of the plurality of support bars 4 is movable upwards and downwards. Each support bar 4 and the support plate 3 are respectively connected with the housing 1. The support plate 3 is provided with an opening 311 configured to allow the support bar 4 to move upwards and downwards. The display screen substrate 200 is suitable for being placed on the support plate 3. The control component 5 is disposed on the housing 1 and is configured to control the support assembly. The sensing component 6 is disposed in the housing 1 and is configured to receive information indicative of picking and placing of the display screen substrate 200. The weight sensor is disposed on the support bar 4 and is configured to detect a change in support weight on the support bar 4.

For example, the control method can include the following steps.

Upon receiving a signal from the mechanical arm 300 configured to pick and place the display screen substrate 200 by the sensing component 6, controlling the two sets of support bars 4 of the support assembly to move upwards to a preset position by the control component 5, so as to reserve a working space for the mechanical arm 300.

Upon detecting a change in support weight on the support bar 4 by the weight sensor, determining a picking or placing state of the display screen substrate 200 according to information of the change in support weight by the control unit 5.

For example, when the support weight is increased, it indicates that the mechanical arm 300 is placing the display screen substrate 200 on the two sets of support bars 4 at this time, which is determined as an operation of placing the display screen substrate 200; then controlling the two sets of support bars 4 to move downwards to a position below the support plate 3 by the control component 5 so that the display screen substrate 200 can be supported on the support plate 3. In this way, the display screen substrate 200 can be uniformly supported by the support plate 3, and the operation of placing the display screen substrate 200 is finished.

For example, when the support weight is reduced, it indicates that the mechanical arm 300 is performing an operation of picking the display screen substrate 200 at this time; then controlling the two sets of the support bars 4 to move upwards while supporting the display screen substrate 200, by the control component 5, so as to move the display screen substrate 200 away from the support plate 3; subsequently, the display screen substrate 200 is supported on the above two sets of support bars 4 and moves upwards along with the support bars 4. Upon the two sets of support bars 4 moving upwards to a preset position, the display screen substrate 200 supported on the two sets of support bars 4 is taken away by the mechanical arm 300, and the two sets of support bars 4 are maintained at the above-mentioned preset position for use next time when placing the display screen substrate 200. In this way, the operation of picking the display screen substrate 200 is finished.

The control method can achieve a smooth pick-and-place operation of the display screen substrate 200; at the same time, an automatic and intelligent pick-and-place operation of the display screen substrate 200 can be realized, and the production efficiency can be improved. Moreover, the control method is simple, reliable, and easy to implement.

In an example, referring to FIG. 5, the support plate 3 can be expanded and retracted in the left-and-right direction. For example, the support plate 3 can be configured to include two sub-support plates 31 as described above; moreover, the pick-and-place device 100 can further include a position sensor configured to detect a height of the working space.

In this example, the control method further includes the following steps.

After the two sets of support bars 4 of the support assembly moving upwards to the preset position, if the height of the working space as detected by the position sensor fails to reach a preset value, then controlling the support plate 3 to retract by the control component 5 to increase the working space, thereby providing a sufficient working space to facilitate a smooth pick-and-place operation of the display screen substrate 200.

Upon detecting a change in support weight on the support bar 4 by the weight sensor, determining a picking or placing state of the display screen substrate 200 by the control unit 5 according to information of the change in support weight.

For example, when the support weight is increased, it indicates that the mechanical arm 300 is placing the display screen substrate 200 on the two sets of support bars 4 at this time, which is determined as an operation of placing the display screen substrate 200. In this case, the control method includes: controlling the support plate 3 to expand and controlling the two sets of support bars 4 to move downwards to a position below the support plate 3 by the control unit 5, so that the display screen substrate 200 is supported on the support plate 3. In this way, a uniform and stable support for the display screen substrate 200 can be provided through the support plate 3, and the operation of placing the display screen substrate 200 is finished.

For example, when the support weight is reduced, it indicates that the mechanical arm 300 is picking the display screen substrate 200. In this case, the control method includes: controlling the two sets of the support bars 4 to move upwards while supporting the display screen substrate 200 by the control component 5, so as to take the display screen substrate 200 away from the support plate 3; then the display screen substrate 200 is supported on the above-mentioned two sets of support bars 4 and moves upwards along with the support bars 4. Upon the two sets of support bars 4 moving upwards to a preset position, taking the display screen substrate 200 supported on the two sets of support bars 4 away by the mechanical arm 300, while maintaining the support plate 3 in a retracted state and maintaining the two sets of support bars 4 at the above-mentioned preset position for use next time when placing the display screen substrate 200. In this way, the operation of picking the display screen substrate 200 is finished.

The control method can intelligently determine whether the size of the working space satisfies the need of use, so that when the working space is insufficient, the smooth pick-and-place operation of the display screen substrate 200 can be achieved by controlling the expanding and retracting of the support plate 3.

What have been described above are only specific implementations of the present disclosure, the protection scope of the present disclosure is not limited thereto. Any modifications or substitutions easily occur to those skilled in the art within the technical scope of the present disclosure should be fallen within the protection scope of the present disclosure. Therefore, the protection scope of the present disclosure should be based on the protection scope of the claims.

The application claims priority to the Chinese patent application No. 201710168374.8, filed on Mar. 20, 2017, the entire disclosure of which is incorporated herein by reference as part of the present application.

What is claimed is:

1. A pick-and-place device of a display screen substrate, comprising:
   a housing;
   a support assembly disposed inside the housing, the support assembly comprising a support plate and two sets of support bars, the support plate extending along a first direction and being capable of expanding and retracting along the first direction, the two sets of support bars being disposed opposite to each other and spaced apart from each other in the first direction, each set of the two sets of support bars comprising a plurality of support bars, the plurality of support bars being arranged at intervals along a second direction perpendicular to the first direction in a plane of the support plate, and each of the plurality of support bars being movable along a third direction perpendicular to the plane of the support plate, the support plate and each of the plurality of support bars being connected with the housing respectively, and the support plate being provided with an opening configured to allow the support bar to move along the third direction; and
   a control component configured to control a movement of the support bars in the third direction, and an expanding and retracting movement of the support plate in the first direction.

2. The pick-and-place device of the display screen substrate according to claim 1, wherein the support plate comprises two sub-support plates, and the two sub-support plates are arranged along the first direction and are connected with the housing respectively, and
   wherein the two sub-support plates are capable of expanding towards each other in the first direction or retracting along a direction away from each other.

3. The pick-and-place device of the display screen substrate according to claim 2, wherein the two sub-support plates are connected by being abutted against each other or by being locked with each other.

4. The pick-and-place device of the display screen substrate according to claim 1, wherein two fixing plates extending along the third direction are arranged in the housing, and the two fixing plates are opposite to each other and spaced apart from each other along the first direction,
   wherein the housing is provided with a guiding groove extending along the first direction, and at least one of the two fixing plates is provided with a guiding block capable of moving along the guiding groove, and
   wherein the two sets of support bars of the support assembly are connected with the two fixing plates respectively and disposed between the two fixing plates, and the support plate of the support assembly is disposed between the two fixing plates and connected with the two fixing plates.

5. The pick-and-place device of the display screen substrate according to claim 1, wherein the control component is disposed on the housing.

6. The pick-and-place device of the display screen substrate according to claim 1, further comprising a plurality of support assemblies, and the plurality of support assemblies are arranged at intervals along the third direction.

7. The pick-and-place device of the display screen substrate according to claim 1, further comprising:
   a sensing component, disposed in the housing and configured to receive information indicative of picking and placing of the display screen substrate.

8. The pick-and-place device of the display screen substrate according to claim 7, wherein the sensing component is an infrared sensing component,
   the infrared sensing component is disposed on an inner sidewall of the housing and is disposed corresponding to the support assembly in the third direction.

9. The pick-and-place device of the display screen substrate according to claim 1, further comprising:
   a weight sensor, disposed on the support bar and configured to detect a change in a support weight on the support bar.

10. A control method for picking and placing a display screen substrate, the display screen substrate being suitable for being stored in a pick-and-place device, the pick-and-place device comprising a housing, a support assembly, a control component, a sensing component, and a weight sensor, the support assembly being provided inside the housing, the support assembly comprising a support plate and two sets of support bars, the support plate extending along a first direction, the two sets of support bars being disposed opposite to each other and spaced apart from each other in the first direction, each set of the two sets of support bars comprising a plurality of support bars, the plurality of support bars being arranged at intervals along a second direction perpendicular to the first direction in a plane of the support plate, and each of the plurality of support bars being movable along a third direction perpendicular to the plane of the support plate, the support plate and each of the plurality of support bars being connected with the housing respectively, and the support plate being provided with an opening configured to allow the support bar to move along the third direction, and the display screen substrate being suitable for being placed on the support plate, the control component being disposed on the housing and configured to control a movement of the support assembly, the sensing component being disposed inside the housing and configured to receive information indicative of picking and placing of the display screen substrate, the weight sensor being disposed on the support bar and configured to detect a change in a support weight on the support bar; and
   the control method comprising:
   upon receiving a signal from a mechanical arm configured to pick and place the display screen substrate by the sensing component, controlling the two sets of support bars of the support assembly to move towards the mechanical arm along the third direction to a preset position by the control component to reserve a working space for the mechanical arm, and
   upon detecting a change in the support weight on the support bar by the weight sensor, determining a picking or placing state of the display screen substrate by the control component according to information of the change in the support weight in such a manner that: the support weight being increased indicates the display screen substrate being placed on the two sets of support bars by the mechanical arm, then controlling the two sets of support bars to move away from the mechanical arm along the third direction to a position below the support plate by the control component so that the display screen substrate is supported on the support plate; and the support weight being reduced indicates the display screen substrate being moving away from the support plate by the two sets of support bars while the two sets of support bars moving towards the mechanical arm along the third direction, then picking the display screen substrate by the mechanical arm and maintaining the two sets of support bars in the preset position.

11. The control method for picking and placing the display screen substrate according to claim 10, wherein the support plate is capable of expanding and retracting along the first direction, and the pick-and-place device further comprises a position sensor configured to detect a height of the working space, the control method further comprises:
after the support bar moving towards the mechanical arm along the third direction to the preset position, if the height of the working space detected by the position sensor fails to reach a preset value, then controlling the support plate to retract by the control component so as to increase the working space; and upon detecting a change in the support weight on the support bar by the weight sensor, determining a picking or placing state of the display screen substrate by the control component according to information of the change in the support weight in such a manner that: the support weight being increased indicates the display screen substrate being placed on the two sets of support bars by the mechanical arm, then controlling the support plate to expand and controlling the two sets of support bars to move away from the mechanical arm along the third direction by the control component to a position below the support plate so that the display screen substrate is supported on the support plate; and the support weight being reduced indicates the two sets of support bars being moving towards the mechanical arm along the third direction while supporting the display screen substrate to move away from the support plate, then picking the display screen substrate by the mechanical arm, maintaining the support plate in a retracted state, and maintaining the two sets of support bars in the preset position.

* * * * *